(No Model.)

J. W. PALMER.
WIRE GATE.

No. 396,230. Patented Jan. 15, 1889.

Witnesses,
G. A. Tauberschmidt
L. B. Whitaker.

Inventor,
James W. Palmer
By his Attorneys
Whitaker & Prevost

UNITED STATES PATENT OFFICE.

JAMES W. PALMER, OF NORTH SPRINGFIELD, MISSOURI.

WIRE GATE.

SPECIFICATION forming part of Letters Patent No. 396,230, dated January 15, 1889.

Application filed July 28, 1888. Serial No. 281,306. (No model.)

*To all whom it may concern:*

Be it known that I, JAMES W. PALMER, a citizen of the United States, residing at North Springfield, in the county of Greene and State of Missouri, have invented certain new and useful Improvements in Wire Gates; and I do hereby declare the following to be a full, clear, and exact description of the invention, such as will enable others skilled in the art to which it appertains to make and use the same.

My invention relates to wire gates of the class adapted to be employed in making passage-ways in wire fences, and has for its object to provide a gate which can be easily and quickly opened and closed, and which cannot be accidentally dislodged. In the use of devices for this purpose various means have been employed to hold each wire of the gate separately in the desired position. These devices, which usually consist of a tightening-lever provided with a locking projection, are rendered almost valueless by the ease with which they may be accidentally disengaged by the jarring of the fence. This jarring may be produced by the wind or by animals rubbing or pressing against the wires of the gate. I avoid these difficulties by my improved constructions and provide a gate which can be instantly locked in position or disengaged, and which will not under any amount of jarring become accidentally displaced. The pressure against the gate by animals will also have no effect upon the locking device, and the gate will remain in operative position unless removed by hand.

Figure 1:
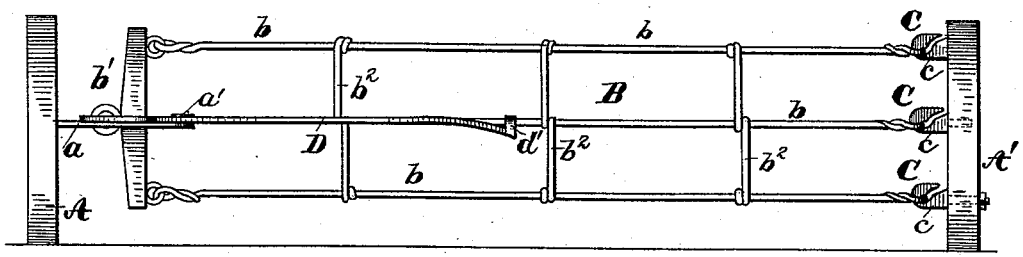
Figure 2:
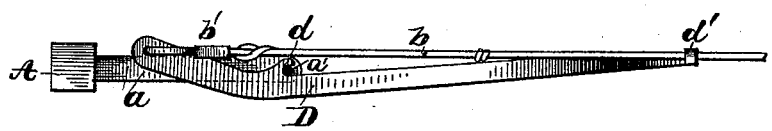
Figure 3:
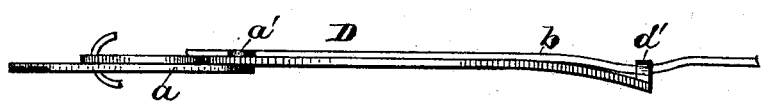
Figure 4:
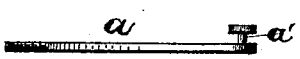
Figure 5:

In the drawings, Figure 1 is a side elevation of one form of gate embodying my invention. Fig. 2 is a top view of the attaching devices. Fig. 3 is a side view of the same. Figs. 4 and 5 are detail views of parts of the mechanism.

In the drawings, A and A' are two posts of a wire fence between which an opening is desired. One of these posts, A', is provided with means for attaching a number of wires thereto, and the other post, A, is provided with a supporting-arm, $a$. The gate B is composed of a number of wires, $b$, extending between the posts, preferably equal in number to the wires of the fence. These wires are provided at one end with rings or loops in any desired manner, which engage with hooks, staples, or other retaining devices attached to post A'. I prefer to employ a hook, C, constructed as shown in the drawings, which consists of a shank screwed into the post or passing entirely through the same and fastened by means of a nut on its outer end and a head, $c$. This head I prefer to provide with a slit or opening, as shown in the drawings, in the form of a compound curve, so as to provide an opening for the reception of the ring or loop, which will prevent said loop from being accidentally disengaged therefrom, but will allow it to move in the opening.

The ends of the wires $b$ which do not engage the hooks C are attached to a cross-bar, $b'$, in any desired way and in such a manner that the wires $b$ will be parallel. At intervals the wires $b$ are preferably braced by cross-wires $b^2$, attached thereto by bending or twisting or in any other desired way, and thus forming a gate; but these cross-wires are not essential and may be dispensed with. To the center of the cross-bar $b'$ is attached the tightening-lever D in any desired way, preferably by means of a ring or link secured to the bar and passing through an aperture in one end of the lever. This lever D is a bar provided near the end where it engages the bar $b'$ with a curved projection, $d$, which forms a bearing for a projection, $a'$, of an arm, $a$, before referred to.

The lever D is bent slightly at a point adjacent to the projection $d$, for a purpose hereinafter specified, and the free end of the lever is provided with a retaining or locking hook or catch, $d'$. The free end of the lever D is bent downwardly at a point near the hook $d'$, as shown in Fig. 3, so that the upper portion of the hook will lie below the plane of the lever when the same is in operative position.

In Fig. 5 I have shown three forms of retaining or locking hooks which I may employ with the lever D. This hook I prefer to form so that it will have a secure hold upon the wire passing through it and will surround the wire in such a manner as to prevent it from being accidentally disengaged therefrom.

In Fig. 4 I have illustrated my preferred form of supporting-arm $a$. This arm is secured to the post A in any desired way, and is provided with a hook or projection, $a'$, at or near its free end. I prefer to provide a projection or stud having a flange extending parallel to the plane of the arm $a$, which serves to prevent the lever D from being disengaged from the stud $a'$. I may, however, construct the projection $a'$ in the form of a hook having its bent portion extending backward toward the post A, if desired.

The operation of the device is as follows: The lever D is placed in position upon the supporting-arm $a$, with the projection $d$ in engagement with the stud $a'$. The free end of the lever is then pressed toward the gate, thus drawing the cross-bar $b'$ toward the post A and tightening all the wires composing the gate. When the lever has been moved to this position, the central wire of the gate is made to engage the hook $d'$ on lever D, thus securely locking the lever in position. It will be seen that the lever being bent near the projection $d$, the cross-bar $b'$ and wires $b$ will be held to the rear of the stud on the supporting-arm $a$ and will not bear against the same. It will also be seen that in placing the wire $b$ in engagement with the hook $d'$ the wire will rest upon the curved portion of the lever D and will be held in a depressed position when engaged by the said hook, as seen in Fig. 3. By this means the tension of the wire will bear down upon the curved portion of the lever and force the hook $d'$ to depress the wire, thereby rendering the accidental displacement of the hook impossible. When it is desired to open the gate, the hook $d'$ is disengaged from the wire and the lever released and removed from the arm $a$, when the gate may be opened.

I may provide a post located at right angles to the posts of the gate and in line with the post A', and attach the gate to the same temporarily, in order to support it when in its open position.

By means of the constructions herein shown and described I provide a gate which can be instantly opened or closed by operating a single lever, and one which cannot be displaced by jarring or the contact of animals.

It will be readily seen that the cross-bar may be attached to the wires which constitute the fence instead of employing separate wires, if preferred or found desirable. This is not my preferred form, but is a cheaper construction and will be found to give perfect satisfaction in most cases, while it has the additional advantage of being very easily and quickly made and placed in operative position. Where the gate is used with great frequency, I prefer to employ the construction first described.

What I claim, and desire to secure by Letters Patent, is—

1. A gate-forming device for wire fences, consisting of a supporting-arm adapted to be secured to a post, a cross-bar adapted to be secured to the wires of the fence, and a locking-lever connected to said cross-bar and adapted to engage the supporting-arm, said lever being provided with a retaining or locking hook adapted to engage a wire of the gate, substantially as described.

2. In a wire fence, the combination, with parallel wires constituting a portion of the fence, of a cross-bar secured to said wires, a supporting-arm secured to a post, and a locking-lever attached to said cross-bar and engaging the supporting-arm, said lever being provided with a retaining-hook adapted to engage one of the said parallel wires, substantially as described.

3. In a wire fence, the combination, with parallel wires, of a supporting-arm provided with a stud and secured to a post, a cross-bar attached to said parallel wires, and a lever having one end pivotally attached to said cross-bar and having a projection intermediate its ends to engage a stud on the supporting-arm, the free end of the lever being provided with a locking-hook to engage a fence-wire, the wire-engaging portion of which is below the horizontal plane of the main body of the lever, substantially as described.

4. The combination, with a wire gate, of an arm adapted to support one end of the same, and an angular lever having one end attached to said gate and provided with a projection to engage a stud on said supporting-arm, the free end of said lever being bent downward and provided with a locking-hook adapted to engage one of the parallel wires, the wire-engaging portion of said hook lying below the plane of the lever, substantially as described.

5. The combination, with a wire fence, of posts, one of which is provided with retaining-hooks and the other with a supporting-arm, a gate consisting of parallel wires engaging the retaining-hooks and provided with a cross-bar, and a lever having one end attached to said cross-bar and provided with a projection to engage the supporting-arm, the free end of said lever being provided with a locking-hook adapted to engage one of the parallel wires, the wire-engaging portion of said hook lying below the plane of the lever, substantially as described.

In testimony whereof I affix my signature in presence of two witnesses.

JAMES W. PALMER.

Witnesses:
L. T. HUNT,
A. OTTERSON, Jr.